Feb. 23, 1932.          C. G. OLSON          1,846,271
                        LOCKING DEVICE
                     Filed Oct. 20, 1928
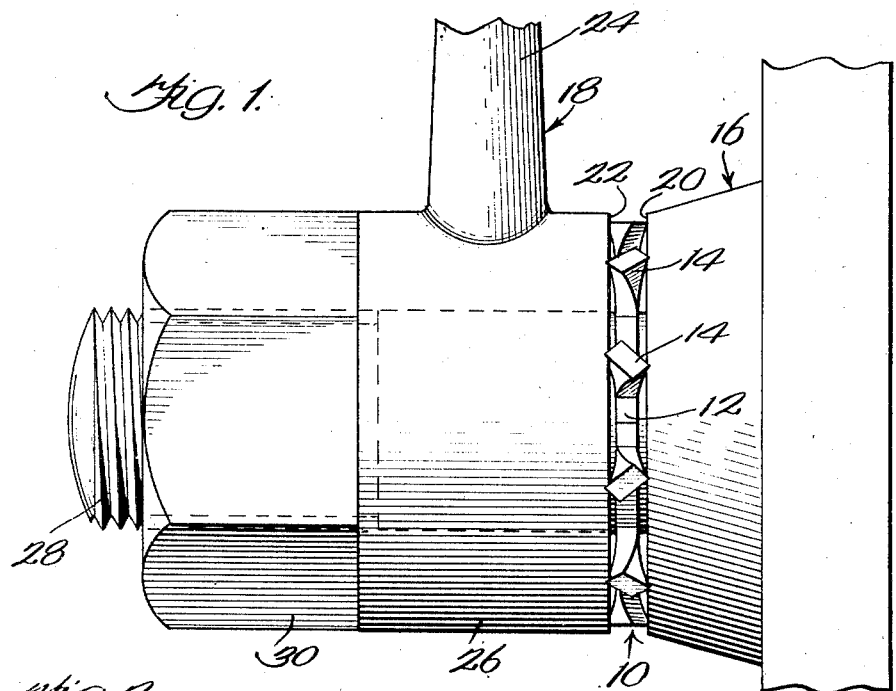
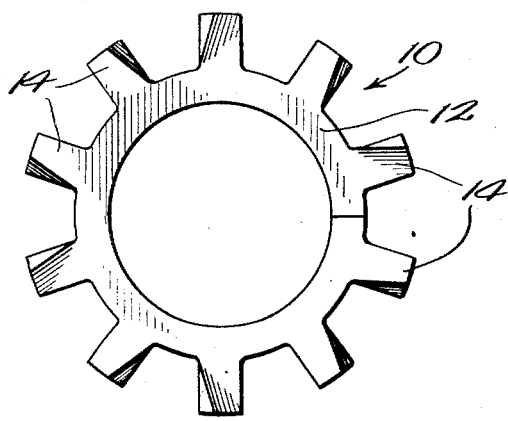
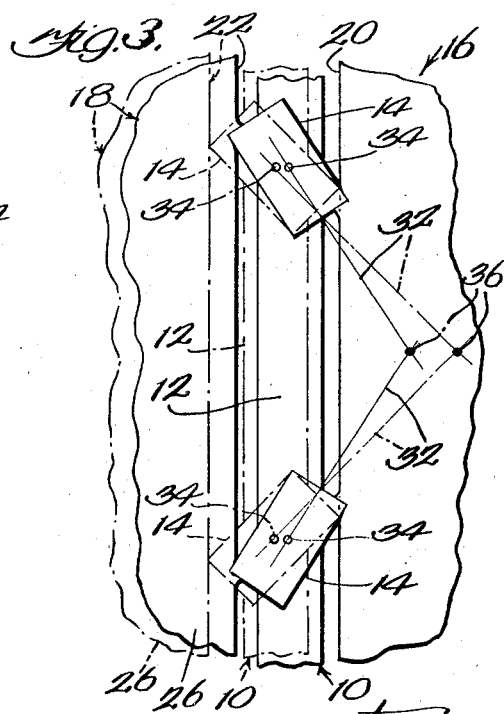
Inventor:
Carl G. Olson
By Cheever & Cox Attys.

Patented Feb. 23, 1932

1,846,271

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCKING DEVICE

Application filed October 20, 1928. Serial No. 313,712.

My invention relates to locking devices and particularly to devices for locking or securing parts such as machine elements and the like against relative movement.

Generally, one of the primary objects of my present invention is to provide a device of simple, economical and rigid construction which may be interposed between opposed surfaces of elements such for example as machine elements, which device will serve, when said elements are clamped together, to positively secure the same against relative movement.

More specifically, it is an object of my present invention to provide a locking device of the instant nature which preferably comprises a piece of flat stock, said stock being provided with work engaging members which are warped or twisted out of the plane of said stock in such a manner that when said stock is associated with the opposed surfaces of elements to be secured and said elements are clamped together, said work engaging or locking members will be rendered effective to positively secure said parts against relative movement in any direction.

Another object of my invention is to provide a locking or connecting device which is adapted to be formed from flat stock, said device being provided with a plurality of work engaging members or teeth which extend out of the plane of the body of said device so that when said device is clamped between opposed surfaces of elements to be secured, said teeth will be rendered effective in response to the applied clamping force to positively oppose, with equal effectiveness, any tendency to cause relative movement between the parts in any direction.

A still further object of my invention is to provide a locking device which is particularly adaptable to secure parts against relative rotation and to this end I propose to provide means comprising a piece of apertured flat stock having a plurality of marginal teeth, certain of said teeth being twisted in one direction out of the plane of the body portion of said stock and certain others twisted in an opposite direction, whereby said teeth are rendered effective when clamped between adjacent surfaces of elements to be secured, said teeth being adapted to imbed themselves within said surfaces so as to positively oppose, with equal effectiveness, any tendency to cause relative rotation of the elements in either direction.

Still more specifically, my invention contemplates the provision of an annular locking device having a body portion which may be formed from suitable flat stock, said device being provided with a plurality of marginal teeth twisted out of the plane of the body portion, alternate teeth being twisted in opposite directions so that when the same are clamped between opposed surfaces of work elements, said clamping force will serve to render effective the binding action of said teeth in opposite directions so as to oppose, with equal force, any tendency to cause relative rotation between the work elements in either direction.

These and other objects will be more apparent from the following detailed description, when considered in connection with the accompanying drawings, wherein—

Figure 1 discloses a locking device representing one embodiment of my invention, in operative association with work elements;

Figure 2 is a plan view of a detached locking device of the type shown in Figure 1; and Figure 3 is a diagrammatic view on an enlarged scale disclosing the manner in which the locking teeth are rendered effective when clamped between the opposed surfaces of the work elements.

Referring now to the drawings more in detail wherein I have employed like numerals to designate similar parts throughout the various figures, it will be observed that one embodiment of my invention resides in the provision of a locking or connecting device indicated generally by the numeral 10, Figures 1 and 2. This locking device 10 comprises an annular body portion 12 and a plurality of marginal teeth 14. It will be noted that these teeth 14 are twisted in opposite directions out of the plane of the body portion 12. The locking device 10 may be very conveniently stamped or otherwise formed from suitable flat stock and the teeth 14 may be designed to suit the particular needs incident to their use.

For the purpose of illustrating one practical application of my improved locking device I have disclosed in Figure 1, a pair of machine elements 16 and 18 which are provided with opposed surfaces 20 and 22 respectively. The element 16 in the particular instance forms a bracket, while the element 18 includes an arm 24 extending outwardly from a hub 26 is mounted upon a pin 28 extending outwardly from the bracket 16. The locking device 10 is positioned between the opposed surfaces 20 and 22 and a nut 30 is adapted to be tightened against the outer face of the hub 26 so as to clamp the locking device 10 between the surfaces 20 and 22.

In Figure 3 I have diagrammatically disclosed the manner in which the locking effectiveness of the teeth 14 is rendered possible in response to the clamping action of the nut 30. The dot and dash lines shown in Figure 5 represent the relative positions of the locking device 10 and the surface 22 of the hub 26 prior to the tightening of the surface 22 against the teeth 14. The solid lines disclose the positions occupied by said parts after the surface 22 has been clamped against said teeth. Lines indicated by the numeral 32 substantially bisect the teeth 14 and hence pass through the center of said teeth which I have indicated by the numeral 34. These lines intersect at a point 36. Prior to the clamping of the surface 22 against the teeth 14, the lines 32 occupy the position shown in dot and dash and after the clamping action, said lines assume the position shown by the solid lines. From this disclosure it will be apparent that adjacently positioned teeth twisted in opposite directions act similarly to toggle arms, if the lines 32 are considered as the positions which would normally be occupied by toggle arms, and hence these adjacent teeth act in opposite directions in response to the clamping force to which they are subjected. In other words, these teeth imbed themselves in the surface of the work so as to exert positive sidewise pressures or rotative forces in different directions, thereby positively preventing relative movement between the elements 16 and 18 in any direction. Thus the teeth 14 act with equal force in opposite directions to secure the elements 16 and 18 against relative rotation. It will thus be apparent that by clamping the teeth 14 between the opposed surfaces 20 and 22 of the work elements, said teeth exert a force axially of the elements so as to imbed themselves in said opposed surfaces and also exert a rotative force in opposite directions along the toggle arm lines 32 so as to positively oppose any tendency to cause relative movement between the elements.

The utility or practical application of my invention is evidenced by the fact that the same is readily adaptable for use in connection with machine parts. In this connection my improved locking device has been effectively employed to substitute the usual type of key which is commonly employed to secure rotary elements such as gears and the like upon a shaft. By clamping my locking device between elements supported by a shaft, said elements may be positively secured against relative rotation without the necessity of forming a key-way within the shaft and elements supported thereby so as to permit the association therewith of a key. The foregoing is only one of numerous instances in which the described locking device has a very practical application. Although light in construction, said locking device provides a means for rigidly securing relatively large machine elements together and its simplicity of design renders the same very desirable from the standpoint of economy in manufacture. The locking teeth of my device may be formed so as to best suit the needs incident to their use, and said teeth will exert sidewise and in some instances rotative forces in opposite directions in response to the force employed to clamp the work elements together.

The foregoing covers my invention by referring to "locking device" as a unit but it should be understood that these devices may be manufactured in strips of any length having a large number of these units connected by narrow sections which may be easily separated into units suitable for the work in hand at the time of their use.

Having thus described my invention, what I claim as new and desire to secure by Letters Patent is:

1. A locking device for securing adjacent work elements against relative movement, including a strut member having portions for engaging both work elements and adapted to exert a locking force in a given direction against the adjacent surfaces of the work elements in response to a force applied to clamp the work elements together, and another strut member having portions for engaging both work elements and adapted to exert a locking force against the adjacent surfaces of the work elements in a different direction in response to the said applied clamping force, whereby said work elements will be positively secured against relative movement in either direction.

2. A locking device for securing adjacent work elements against relative movement, including a member having work engaging edges, at least one for each work element, and adapted to be angularly positioned with respect to one of the adjacent surfaces of the work elements to provide a locking strut, and another member having work engaging edges, at least one for each work element, and adapted to be angularly positioned with respect to an adjacent surface of the work elements to provide an oppositely acting locking strut, said work engaging members being adapted, in response to a force applied to clamp the work elements together, to exert a locking force in opposite directions with substantially equal degrees of effectiveness, whereby said work elements will be positively secured against relative movement in any direction.

3. A locking device for securing adjacent work elements against relative movement, including a member, a tooth associated with said member and having a work engaging edge for each work element positioned out of the plane of said member, said tooth being angularly disposed with respect to the surfaces of the work so as to exert a locking strutting force in a given direction against a surface of the work in response to a force applied to clamp the work elements together, and another work engaging tooth associated with said member angularly disposed in a direction opposite to the disposition of the first mentioned tooth having a work engaging edge for each work element positioned out of the plane of said member and adapted to exert a locking force against a surface of the work in an opposite direction in response to said clamping force, whereby said work elements will be positively secured against relative movement in any direction.

4. A locking device for securing adjacent work elements against relative movement, including a body portion of flat stock having a tooth warped out of the plane thereof in one direction and adapted to engage both work elements, and another tooth warped out of the plane of said body portion in the opposite direction and adapted to engage both work elements, whereby the work engaging edges of said teeth will be adapted to exert a locking force in opposite directions in response to a force applied to clamp the work elements together, whereby said teeth operate with substantially equal effectiveness so as to positively prevent any relative movement between said work elements.

5. A locking device for securing adjacent work elements against relative rotation including a body portion of flat stock having a plurality of marginal work engaging teeth of substantially equal size and shape, certain of said teeth being warped out of the plane of the body portion in one direction and adapted to engage both work elements and certain others in an opposite direction and adapted to engage both work elements, said teeth being adapted, when clamped against a surface of the work elements, to imbed themselves within said surface and to exert substantially equal rotative forces in opposite directions so as to positively secure said work elements against relative rotation in either direction.

6. A locking device for securing adjacent work elements against relative rotation including an annular body section of flat spring stock, and a plurality of radially positioned teeth spaced along the margin of said annular body portion, alternate teeth being twisted in a given direction so as to present sharp work engaging corners on opposite sides of the body portion and the remaining alternate teeth being twisted in the opposite direction so as to present sharp work engaging corners on opposite sides of said body portion, adjacently positioned teeth having a tendency when clamped between the work surfaces to dig into said surfaces and to untwist sufficiently so as to effect a positive toggle locking action and thereby secure the parts against relative rotation.

7. A locking device of the class described for securing adjacent work elements against relative movement, including an annular body portion of flat spring stock, a plurality of marginal prongs extending from and formed integral with said body portion, each prong including a body section and work engaging edges positioned at opposite sides thereof, certain of said body sections being inclined in a given direction with respect to the annular body portion so as to position said work engaging edges out of the plane of said annular body portion, and the body sections of the remaining prongs being inclined oppositely with respect to said annular body portion so as to position the work engaging edges thereof out of the plane of said annular body portion, whereby, when said device is clamped between the adjacent surfaces of said work elements, certain of said prongs will serve to secure said work elements against rotation in one direction and the remaining prongs will serve to secure said elements against rotation in the opposite direction.

In witness whereof I have hereunto subscribed my name.

CARL G. OLSON.